C. F. WALLACE.
VARIABLE ORIFICE VALVE.
APPLICATION FILED MAR. 27, 1919.
1,326,998.
Patented Jan. 6, 1920.
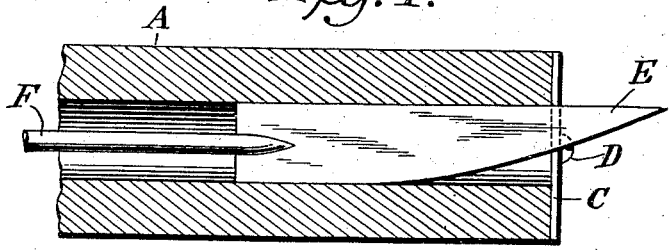
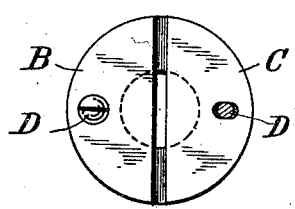 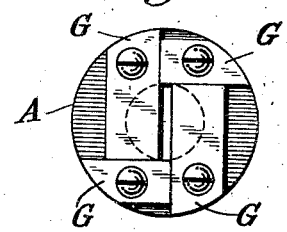
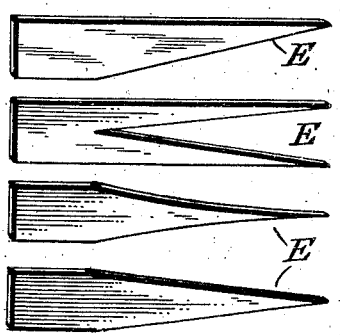
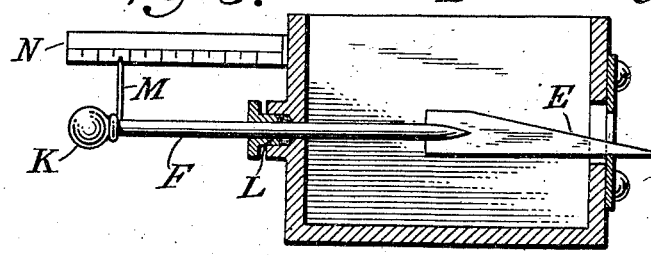
Charles F. Wallace
Inventor,
by Kerr, Page,
Cooper & Hayward
Attorneys.

UNITED STATES PATENT OFFICE.

CHARLES F. WALLACE, OF NEW YORK, N. Y., ASSIGNOR OF ONE-HALF TO MARTIN F. TIERNAN, OF JAMAICA, LONG ISLAND, NEW YORK.

VARIABLE-ORIFICE VALVE.

1,326,998.  Specification of Letters Patent.  Patented Jan. 6, 1920.

Application filed March 27, 1919. Serial No. 285,474.

*To all whom it may concern:*

Be it known that I, CHARLES F. WALLACE, a citizen of the United States, residing at Tompkinsville, borough of Richmond, city and State of New York, have invented certain new and useful Improvements in Variable-Orifice Valves, of which the following is a full, clear, and exact description.

The invention which is the subject of this application for Letters Patent resides in a device in the nature of a valve for controlling the flow of liquids or gases particularly when under pressure. Primarily, the object of the improved construction is to provide a variable orifice for the passage of the liquid or gas, but other objects are to so arrange the mechanism as to secure an orifice that may be varied in area to control the flow according to any predetermined ratio of increase or decrease, and, in general, to produce a device of this character which is simple in construction, readily adjustable and designed so as to insure a high degree of accuracy, and capable of self-cleaning.

In carrying out my improvement I have devised a device consisting essentially of a rigid member having therein a rectangular slot, and a movable member, preferably in the form of a thin flat blade, rectangular in the rear and suitably tapered at its forward end, which passes through the rectangular slot, so that the adjustment of the blade in line with its axis varies the orifice through the rectangular slot according to any ratio that may be desired and dependent upon the comformation of the tapered portion of the blade.

The nature and purpose of this device will be more readily comprehended from the detailed description with reference to the drawings which follow:

Figure 1 is a longitudinal central section of a pipe or conduit provided at its end with the improved variable orifice.

Fig. 2 is an end view of the device of Fig. 1 showing the rectangular slot.

Fig. 3 is a similar view showing a modified way of securing this slot.

Fig. 4 shows various modified forms of blades for use in the device, and

Fig. 5 is a sectional view of a tank illustrating the manner of using the device with certain accessories to be hereinafter described.

Referring to Fig. 1: A designates any suitable pipe or conduit, the passage through which is to be controlled by this variable orifice. For this purpose its end is closed by two plates B and C, one or both of which are adjustable to and from each other as by means of slots through which pass the clamping screws D, as shown in Fig. 2, said plates thus forming a substantially rectangular and relatively narrow slot.

E is a blade designed with a thickness to fit the walls of the slot, and having a rectangular body with a tapering end, which latter extends through the slot. The blade by means of a rod F connected therewith is made adjustable.

In lieu of two oppositely placed plates B and C, four plates G may be used for the same purpose and these may be adjustably secured to the rigid member A so as to be capable of varying the dimensions of the slot, and so avoiding leakage.

The tapered end of the blade E may be variously formed, as shown in Fig. 4. In the case of the blade at the top of the figure it is shaped to give a straight line increase or decrease to the flow according to the adjustment. In the next lower blade, the slot is central so that the blade may be automatically guided. In the third specimen, the blade is designed to give a more arbitrary increase in flow, such a form being suitable to certain conditions of use. The blade shown at the bottom of the group is similar to the third, but is tapered to give a straight line increase.

In Fig. 5 is shown a device which is typical of those with which the device is designed to be used. This comprises a receptacle of any suitable kind H in one end of which is established the slot. The blade E is carried by the rod F, which latter is provided with a knob or handle K and passes through a stuffing box L. The rod F carries also a pointer M which is designed to slide over a graduated scale N to indicate the adjustment of the blade or the rate of flow for which its adjustment provides.

This device I have found to be most useful in controlling the flow of liquids and gases in various forms of apparatus. It is capable of nice adjustment; it has the highly valuable property of remaining always free and clean, and under some conditions of use the peculiar shape of the orifice through the slot is most desirable and useful.

What I claim is:

1. In combination, a rigid body having a rectangular slot therein forming an orifice the plane of which is fixed, and means comprising a flat blade movable through said slot for varying the area of said orifice, said blade being of substantially the same thickness as the width of said slot and of sufficient width completely to close said slot.

2. A variable orifice comprising in combination with an opening in a receptacle of plates clamped thereto parallel to the plane of the opening and defining a rectangular slot, of a flat blade fitting the sides of the slot and having a tapered end passing through the slot and adjustable with respect thereto.

3. A variable orifice comprising in combination adjustable plates forming a rectangular slot of variable dimensions, a flat blade having a rectangular body and tapered end which passes through the slot, said blade being movable with reference to the slot.

In testimony whereof I hereunto affix my signature.

CHARLES F. WALLACE.